US010773476B2

(12) United States Patent
Kissling et al.

(10) Patent No.: US 10,773,476 B2
(45) Date of Patent: Sep. 15, 2020

(54) METHOD OF PRODUCING A DECORATED ELEMENT FOR A TIMEPIECE OR PIECE OF JEWELLERY, AND ELEMENT MADE BY THE METHOD

(71) Applicant: OMEGA S.A., Biel/Bienne (CH)

(72) Inventors: Gregory Kissling, Macolin (CH); Stephane Lauper, Cortaillod (CH); Igor-Emmanuel Uldry, Cortaillod (CH); Marc Stranczl, Nyon (CH); Stephane Kinkio, Lamboing (CH); Sebastien Hostettler, Sonceboz (CH); Gilliane Burli, Le Landeron (CH)

(73) Assignee: OMEGA S.A., Biel/Bienne (CH)

( * ) Notice: Subject to any disclaimer, the term of this patent is extended or adjusted under 35 U.S.C. 154(b) by 525 days.

(21) Appl. No.: 14/918,945

(22) Filed: Oct. 21, 2015

(65) Prior Publication Data
US 2016/0176126 A1  Jun. 23, 2016

(30) Foreign Application Priority Data

Dec. 19, 2014 (EP) .................................... 14199501

(51) Int. Cl.
*B29C 70/74* (2006.01)
*B29B 11/06* (2006.01)
(Continued)

(52) U.S. Cl.
CPC .......... *B29C 70/747* (2013.01); *B22F 3/1055* (2013.01); *B22F 5/007* (2013.01);
(Continued)

(58) Field of Classification Search
CPC ... B29C 70/747; B29C 70/745; B22F 3/1055; B22F 5/007; B22F 2998/00;
(Continued)

(56) References Cited

U.S. PATENT DOCUMENTS 4,139,667 A * 2/1979 Blue .................. A44C 17/0208
156/63
4,869,940 A * 9/1989 Shoshani ................ B32B 15/08
428/138
(Continued)

FOREIGN PATENT DOCUMENTS

CH     707 533 A2    7/2014
EP   0 453 382 A1   10/1991
(Continued)

OTHER PUBLICATIONS

European Search Report dated Jul. 9, 2015 in European application 14199501, filed on Dec. 19, 2014 ( with English Translation).

*Primary Examiner* — John A Hevey
(74) *Attorney, Agent, or Firm* — Oblon, McClelland, Maier & Neustadt, L.L.P.

(57) ABSTRACT

The method makes it possible to produce a decorated element for a timepiece or piece of jewelry. This decorated element may be, for example, a watch dial. The method includes the steps of taking a base substrate, and micromachining on said base substrate a mould or decorative partitions in a programmed pattern, and filling the mould or the decorative partitions with at least one filler material to obtain the decorated element. The filler material may be enamel.

15 Claims, 2 Drawing Sheets

(51) Int. Cl.
  *B29B 11/14* (2006.01)
  *B44C 5/00* (2006.01)
  *G04B 45/00* (2006.01)
  *G04B 5/16* (2006.01)
  *G04B 19/04* (2006.01)
  *G04B 45/04* (2006.01)
  *G04B 19/12* (2006.01)
  *B22F 5/00* (2006.01)
  *B22F 3/105* (2006.01)
  *B44C 1/22* (2006.01)
  *B44C 3/10* (2006.01)
  *C23D 5/06* (2006.01)
  *C23C 24/10* (2006.01)
  *B29K 63/00* (2006.01)
  *B29L 31/00* (2006.01)
  *B22F 3/24* (2006.01)
  *B05D 5/06* (2006.01)

(52) U.S. Cl.
  CPC ............ B29B 11/06 (2013.01); B29B 11/14 (2013.01); B29C 70/745 (2013.01); B44C 1/22 (2013.01); B44C 3/10 (2013.01); B44C 5/00 (2013.01); C23C 24/10 (2013.01); C23D 5/06 (2013.01); G04B 5/16 (2013.01); G04B 19/042 (2013.01); G04B 19/12 (2013.01); G04B 45/00 (2013.01); G04B 45/046 (2013.01); B05D 5/06 (2013.01); *B05D 2202/00* (2013.01); *B05D 2350/65* (2013.01); *B22F 2003/247* (2013.01); *B22F 2998/00* (2013.01); *B29K 2063/00* (2013.01); *B29K 2905/00* (2013.01); *B29K 2909/02* (2013.01); *B29L 2031/722* (2013.01); *Y02P 10/292* (2015.11); *Y02P 10/295* (2015.11)

(58) Field of Classification Search
  CPC ... B22F 2003/247; G04B 45/00; G04B 19/12; G04B 5/16; G04B 45/046; G04B 19/042; B29B 11/06; B29B 11/14; B44C 5/00; Y02P 10/292; Y02P 10/295; B29K 2905/00; B29K 2063/00; B29K 2909/02; B29L 2031/722
  See application file for complete search history.

(56) References Cited

U.S. PATENT DOCUMENTS

| | | | | |
|---|---|---|---|---|
| 5,624,510 | A * | 4/1997 | Uchida | B28B 1/00 156/62.2 |
| 5,640,667 | A * | 6/1997 | Freitag | B22F 3/1055 419/31 |
| 5,800,892 | A * | 9/1998 | Yee | B44C 5/00 156/63 |
| 9,766,590 | B2 * | 9/2017 | Stranczl | G04B 19/042 |
| 10,086,642 | B2 * | 10/2018 | Dubach | B44C 5/00 |
| 2002/0127128 | A1 | 9/2002 | Har-Shai | A44C 9/00 419/1 |
| 2002/0144515 | A1 * | 10/2002 | Zieverink | A44C 27/00 63/23 |
| 2006/0201205 | A1 * | 9/2006 | Leu | B22F 5/007 65/374.11 |
| 2009/0072436 | A1 * | 3/2009 | Dean | B29C 33/306 264/219 |
| 2010/0054089 | A1 * | 3/2010 | Maier | B81C 99/0085 368/169 |
| 2011/0203934 | A1 * | 8/2011 | Rey-Mermet | G03F 7/00 205/67 |
| 2011/0225801 | A1 * | 9/2011 | Fussinger | G04B 15/14 29/525.01 |
| 2014/0332507 | A1 * | 11/2014 | Fockele | B22F 3/1055 219/121.61 |
| 2014/0356638 | A1 | 12/2014 | Wang et al. | |
| 2015/0021190 | A1 * | 1/2015 | Schmitz | C25D 1/003 205/50 |
| 2016/0176228 | A1 * | 6/2016 | Dubach | B44C 5/00 428/156 |

FOREIGN PATENT DOCUMENTS

| | | |
|---|---|---|
| EP | 2 316 299 A1 | 5/2011 |
| EP | 2 806 315 A2 | 11/2014 |

* cited by examiner

METHOD OF PRODUCING A DECORATED ELEMENT FOR A TIMEPIECE OR PIECE OF JEWELLERY, AND ELEMENT MADE BY THE METHOD

This application claims priority from European Patent Application No. 14199501.9 filed Dec. 19, 2014, the entire disclosure of which is hereby incorporated herein by reference.

FIELD OF THE INVENTION

The invention concerns a method of producing at least one decorated element for a timepiece or piece of jewelry.

The invention also concerns a decorated element obtained according to the production method.

BACKGROUND OF THE INVENTION

In order to decorate an element or component of a timepiece or piece of jewelry, a hot enameling technique may be used, particularly after a set of cells or partitions has been created on the element or on the component. This conventional technique known as "cloisonné" is one of numerous enameling techniques, which include amongst others: "grisaille", dry applique, painting on enamel, "champlevé", "basse-taille", "plique-á-jour", relief enameling, "paillonné", to name the main techniques. The principle of this traditional decorative technique consists in manually creating a design formed of metal wire partitions, then filling the partition walls with successive layers of transparent or opaque enamels on a metal or ceramic support. The raw materials of the vitreous substance known as enamel are mainly silica, in the form of very pure sand, feldspars, pegmatites, chalk, lime and sometimes kaolin, associated with metal compounds to give the enamel its colour. This substance deposited on a surface of a component is fired until it fuses and adheres to the metal or ceramic component. The process of creating the decoration by various manual steps is long and cannot be reproduced in an identical manner from one component to the next, which is a drawback.

In the case of the "cloisonné" or partitioned technique, there are generally at least nine steps required to create the decorated element. In a first step, a drawing of the pattern must be created directly on paper or on a computer with life-size printing of the drawing. In a second step, the patterns of the decoration are produced by hand by means of a metal wire on the drawing used as a base. In a third step, the drawing is reproduced on a metal or ceramic support, notably by hand engraving, machine engraving or free hand engraving. In a fourth step, the metal or ceramic support is enamelled with a first layer of transparent enamel. In a fifth step, the patterns of the decoration are placed on the enamelled ceramic or metal support to form the "cloisonné" or partitioned patterns. In a sixth step, the decoration patterns are glued to the metal or ceramic support to hold the partitions. In a sixth complementary step, the decoration patterns secured to the ceramic or metal support are leveled. The seventh step consists in firing the enamelled support with the glued partitions, in order to trap them in the enamel as it fuses to obtain solid and hardened partitions. In the eighth step, the enameling operation is performed in several placing and firing phases. The ninth step consists of stoning and polishing the enamelled part. This constitutes a very large number of steps for such a method of producing a decorated element, which is a drawback.

It is also to be noted that there several problems remain as regards the aforementioned technique for producing a decorated element. These problems are, on the one hand, the manual production of the decorations, and the geometry, placing and hold thereof. The decorations are metal wires or metal strips bent into simple geometric shapes. The wires or strips are held together by adhesive bonding, which has the drawback of being neither rigid nor impermeable.

CH Patent Application No 707 533 A2 describes a method for manufacturing a watch dial decorated with embroidery. First of all, a decal etch is made in a cloth canvas or embroidery. Once the overlay or copy sheet is pierced with the desired design, a powder is spread over the overlay. The design is then printed on the canvas to reveal the design for the embroidery operation, which follows this printing step. Once the embroidery is finished, the decorated canvas is bonded to a support, such as a watch dial. This method also includes a very large number of steps for decorating the watch dial, which is a drawback. Further, it is not possible to produce a decoration of complex shape with this method.

EP Patent Application No. 2 316 299 A1 describes a timepiece or piece of jewelry and the method of fabricating the same. The piece includes a metal base structure, which is provided with a relief decoration, and with an elastomer layer deposited on a surface of the structure by means of an adhesion layer. The decorative design is obtained by milling or chemical etching or laser or stamping, but it cannot produce a sufficiently precise decoration of complex shape, which is a drawback.

EP Patent Application No. 2 806 315 A2 describes the creation of a watch component, such as a coloured dial or display. To achieve this, an opaque silicon wafer is used as the base on which a first thin film of silicon nitride is deposited. A photosensitive resin mask is arranged on the first film for a photolithography operation. Illuminated portions of the resin are removed and the first film is etched. Thereafter, a metal or ceramic layer is deposited. However, it is difficult to obtain a decoration that is sufficiently precise and of complex shape, which is a drawback.

SUMMARY OF THE INVENTION

It is therefore an object of the invention to propose a method for producing a decorated element for a timepiece or piece of jewelry that overcomes the drawbacks of the aforementioned prior art to facilitate the manufacture of such a decorated element, and the reproducibility thereof.

To this end, the invention concerns a method for producing a decorated element for a timepiece or piece of jewelry, the method includes the steps of:
- taking a base substrate, and micromachining on said base substrate a mould or decorative partitions in a programmed pattern, and
- filling the mould or decorative partitions with at least one filler material to obtain the decorated element, wherein the mould or the decorative partitions are obtained by the selective melting or selective sintering of a powder on the base substrate in a selective melting or selective sintering machine using a laser beam or an electron beam or in an additive fabrication machine of a metal, ceramic or ceramo-metallic material, such as cermet, along a stored line of the pattern to be created.

Particular steps of the method for producing a decorated element are defined in the dependent claims.

One advantage of the method for producing a decorated element lies in the fact that it is possible to produce three-dimensional decorations of complex shape. The decorations can be made directly on a metal, ceramic or ceramo-metallic object, such as cermet and on an industrial scale. To improve adherence to the decoration, the objects may be treated with a metallic or ceramic or cermet layer from the same family as the materials of the decoration. The decorations are pre-drawn or pre-programmed on a computer, which makes it possible to create very complex and reproducible volumes. This makes it possible to reduce the number of steps for producing said decorated element. In the case of the "cloisonné" technique, it is possible to have only five fabrication steps and the partitions produced are impermeable.

One advantage of the method for producing the decorated element lies in the fact that it is possible to obtain partitions or walls or a mould on a base substrate by a selective laser or electron beam sintering or melting technique, for example, performed on at least one metal or ceramic or ceramo-metallic powder, such as cermet. The term 'melting' is associated with metal powders, while the term 'sintering' is associated with ceramic or ceramo-metallic powders. Once the metal or ceramic or ceramo-metallic powder partitions are made on the base substrate, a filler material, such as enamel, is inserted in the partitions for an enameling operation. It is possible to use, for certain applications employed for cold enameling techniques, a thermo-hardening polymer containing coloured pigments. This type of polymer may be an epoxy type resin.

Advantageously, it is also possible to use a LIGA type method on a metal or semiconductor substrate, such as silicon, to create the walls or partitions or mould on the base substrate before inserting the filler material, which may be enamel or a polymer or a metal or ceramic alloy or a cermet. Subsequently, the base substrate can be removed to obtain the decorated element, which includes only the partitions and the coloured filler material arranged between the partitions.

Advantageously, once the filler material is partially or wholly inserted in the partitions or the mould, one or more additional selective sintering or selective melting operations can be performed with the powder to obtain a three-dimensional decoration which may or may not be trapped inside the filler material.

To this end, the invention also concerns a decorated element obtained by the production method wherein the element includes a filler material held to partitions of a mould or decorative walls micromachined in a programmed pattern.

Specific embodiments of the decorated element are defined in the dependent claims.

BRIEF DESCRIPTION OF THE DRAWINGS

The objects, advantages and features of the method for producing a decorated element for a timepiece or piece of jewelry and the decorated element obtained will appear more clearly in the following description with reference to the drawings, in which.

DETAILED DESCRIPTION OF THE INVENTION

In the following description, any techniques for producing decorative patterns for a watch or jewelry element that are well known in the state of the art will be referred to only in a simplified manner. The decorative patterns concern walls or partitions or a mould deposited on a base substrate by techniques defined as micro-machining techniques.

Preferably, the invention particularly concerns the application of mass production processes to certain steps of the "cloisonné" and "plique-á-jour" techniques. With these two techniques, it is possible, for example, to enamel a volume pattern by first creating partitions with metal wires or strips. These partitions are preferably placed on a base substrate, which may be metal or another material indicated below.

The method for producing a decorated element for a watch or piece of jewelry includes a first essential step of creating partitions or walls or a mould on the base substrate by a micromachining technique. The base substrate may be a crystalline or amorphous metal material, a ceramic, a semiconductor, a cermet, or any other material. As regards the ceramic, this concerns alumina, zirconia, magnesium oxide, boron nitride, silicon nitride, silicon carbide, aluminium titanate and aluminium nitride, or other types of ceramic. It is also possible to have base substrate made of quartz, glass, sapphire, corundum or another type of precious stone. The material of the mould or the partitions may be the same as that of the base substrate. When an enameling operation follows the first step, the material used for the base substrate and that of the partitions must be able to withstand firing in a furnace during the enameling.

The decorative patterns defined by the partitions are first drawn or programmed in a computer, and the stored drawing or pattern data is transmitted to the micromachining machine in order to produce said partitions. Thereafter, another operation is performed to fill the partitions with a filler material, which may be a thermo-hardening polymer, a metal alloy, a ceramic, a cermet or preferably enamel containing coloured pigments. The enamel may be deposited or secured hot or cold. In the case of an enameling operation, this operation is briefly explained below.

Figure 1:
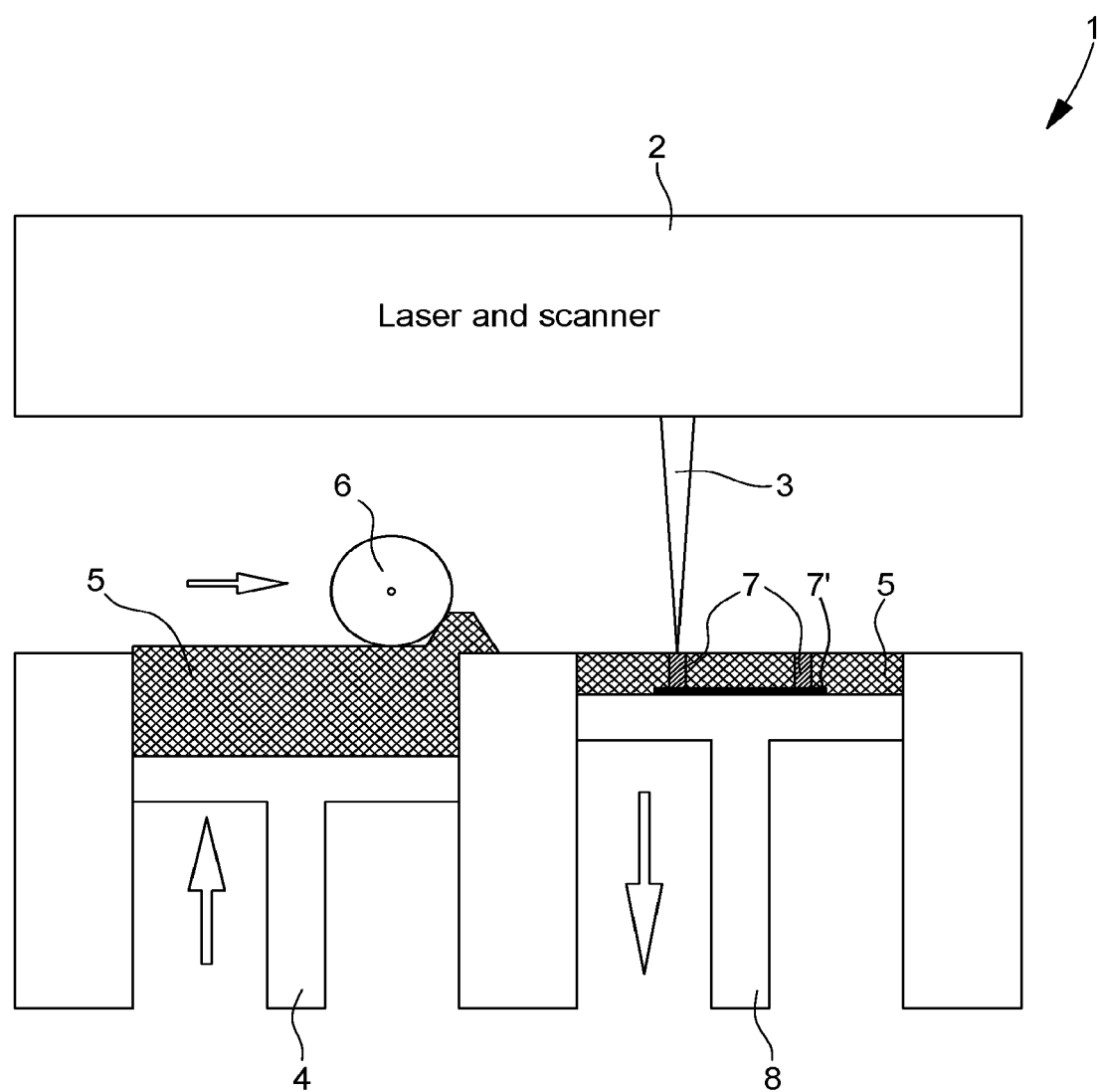
FIG. 1 shows a simplified view of a selective sintering or selective melting machine for producing walls or partitions on an element of a watch component or piece of jewelry according to the invention.

FIG. 1 shows one of the techniques for creating walls, partitions or a mould on a base substrate of an element for a watch or piece of jewelry. This technique is the selective laser sintering or selective laser melting of a powder, notably a metal, ceramic or ceramo-metallic powder, on the base substrate. The metal powder may be steel, nickel, nickel-chromium, nickel-chromium-molybdenum, titanium, copper, gold or another metal or metal alloy. This type of metal material must normally have a higher melting point than that of the enamel, if an enameling operation is subsequently performed.

The selective melting or selective sintering machine 1, essentially includes a laser unit and scanner 2 for generating a laser beam 3 to be directed at a metal, ceramic or ceramo-metallic powder 5 arranged on a plate 8, on which a base substrate 7' is initially placed. Laser beam 3 is directed at the powder along a stored line of the pattern to be created. As a result of heating by laser beam 3 as energy source, part of the metal powder melts and agglutinates or solidifies to form a structural portion 7 of the pattern to be created on base substrate 7'.

Since the selective melting of the powder normally occurs in layers, once laser beam 3 has scanned the entire surface of powder 5 along the defined line, plate 8 can move down a notch. Another layer of metal powder 5 can be pushed from another plate 4 of a powder reservoir by a powder feeder or powder distribution device, such as a roller 6 or a scraper above plate 8. Laser beam 3 again scans the new powder, in order to agglutinate part of powder 5 on the preceding structural portion 7. The other plate 4 can also move up a notch to bring another part of powder 5 out of the powder reservoir so that it can be pushed by the powder feeder in a successive step.

Of course, it is also possible to envisage performing a selective electron beam melting (SLM) operation or a selective electron beam sintering operation instead of using a laser beam. It is also possible to use an additive fabrication machine to form one layer or a superposition of metal and/or ceramic and/or ceramo-metallic layers in order to create metal or ceramic or ceramo-metallic (such as cermet) sandwich layers.

It is to be noted that, in the case of a metal powder 5, this is deposited in the form of thin layers, typically on the order of 50 μm on base substrate 7' of the element on plate 8. These successive layers are selectively melted one after the other to form the complex metal partitions of the desired pattern. The precision of the selective laser or electron beam melting ranges from 0.1 mm to 0.02 mm depending on the particle size and selective melting conditions used, namely the scanning speed and energy of laser or electron beam 3. This makes it possible to create extremely precise decorations of the element.

It is to be noted that the selective sintering on the base substrate can also be performed with ceramic or cermet powders, for example. With ceramic powder of the yttria-stabilised zirconia type, for example, selective laser sintering is possible. For such selective sintering, the ceramic powder may or may not include a binder, which may be a polymer material. One type of binder may be methyl polymethacrylate, polyvinyl butyral, methyl ethyl ketone 'MEK'. For the metal powder, no binder is used, since the irradiated powder melts and subsequently solidifies.

In principle, in order to achieve selective melting or selective sintering of a powder on the base substrate, at least one intermediate layer could also be created on said base substrate to ensure good bonding of the fused or sintered powder to the material of the base substrate. Initially, a first, for example white or transparent enamel layer could be created on the base metal substrate, on which there is performed selective laser or electron beam sintering of a ceramic or ceramo-metallic powder to obtain the mould or the decoration partitions. One or more PVD or galvanic metal layers could also be deposited, which could also serve as conductive base layers for the galvanic growth. A low temperature solder could also be melted at the surface of the base substrate before a selective laser or electron beam melting operation of, for example, a metal powder. Once the partitions or mould have been formed and the filler material is inserted, an additional metallic or ceramic or ceramo-metallic type layer could be added to create a three-dimensional pattern.

Figure 2:
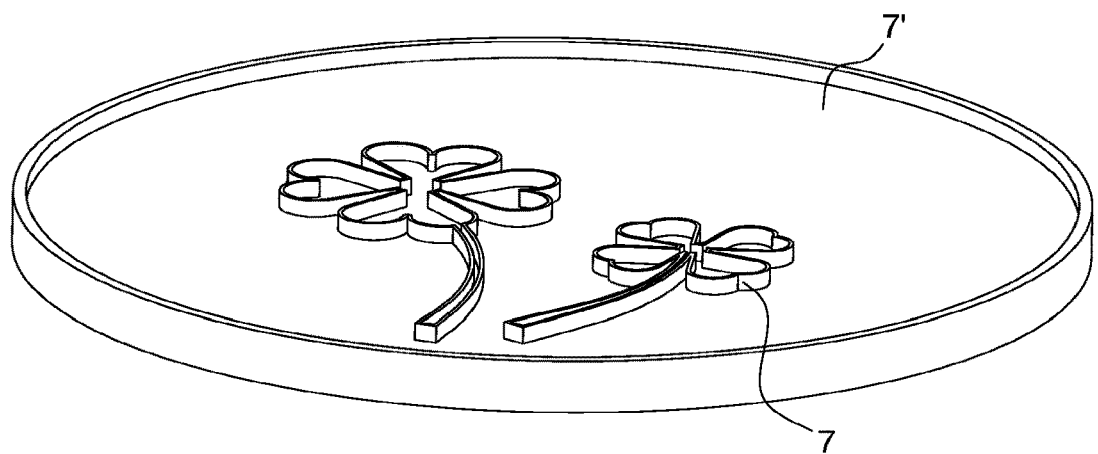
FIG. 2 shows an element of a watch component or piece of jewelry with walls or partitions made according to the invention.

Once pattern 7 is finished, the element with the pattern can be removed from the selective melting or selective sintering machine 1 by removing all the non-solidified metal powder around the pattern structure. This element, for example in the form of a watch dial, is shown with its pattern in a three-dimensional view in FIG. 2. Preferably, for components using hot enameling, to prevent oxidation during hot enameling, it is possible to envisage depositing a galvanic layer on the partitions or the mould. This galvanic layer is composed of a noble metal or metal alloy, such as 24 carat gold, fine platinum, fine rhodium, fine palladium, or any other precious metal or metal alloy.

Figure 3:
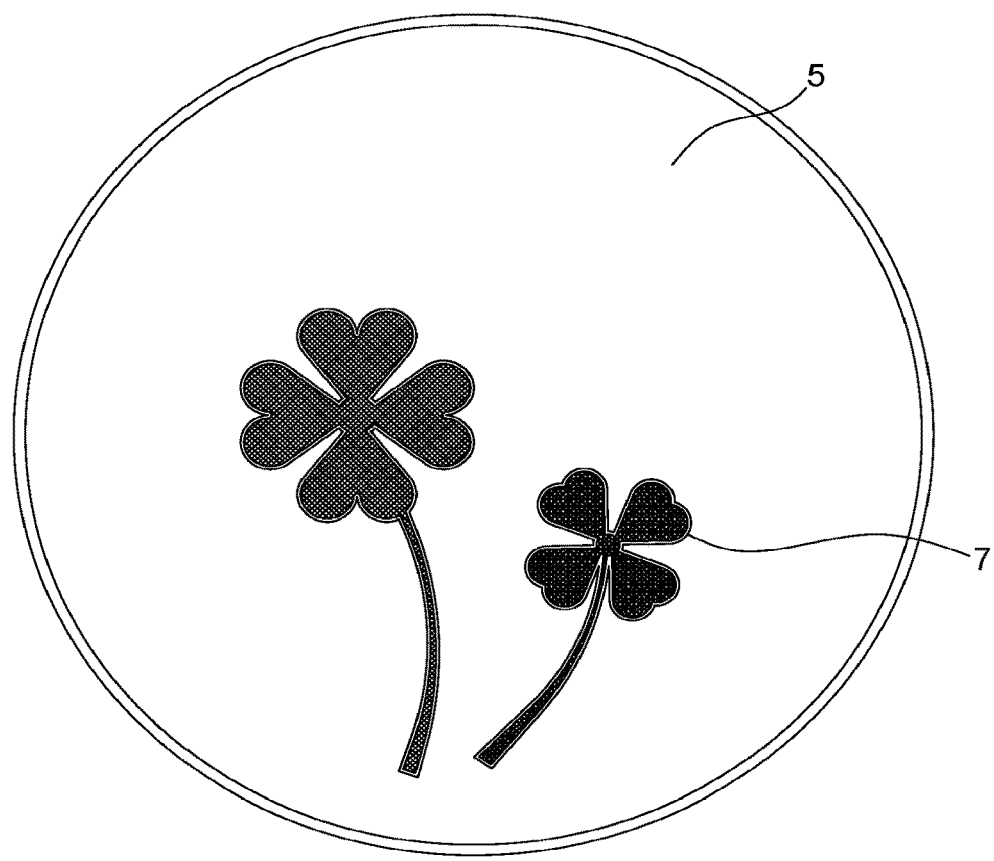
FIG. 3 shows an element of a watch component or piece of jewelry after the enameling operation according to the invention.

Thereafter, it is possible to perform an enameling operation on the element with the partitions or mould of the created pattern. To achieve this, the spaces between the partitions are filled with vitreous substances. The raw materials of these vitreous substance are mainly silica, feldspars, pegmatites, chalk, lime and sometimes kaolin, associated with metal compounds to give the enamel its colour. Once the partitions of the pattern of the element are filled with vitreous substances, firing is performed in a furnace, for example, at a temperature close to 800° C. for enamels, which fuse to the metal objects. The decorated element in the form of a dial is shown in FIG. 3.

Once the enameling operation is finished, it is also possible to envisage removing the base substrate, which is, for example, metal or ceramic or ceramo-metallic, or even made of semiconductor material, by a machining or selective dissolution operation. The decorated element obtained after the method therefore includes portions of enamel surrounded by the pattern structure.

Of course, once pattern 7 is finished on the base substrate after the selective melting or selective sintering operation, it is possible to envisage filling the partitions created with a filler material other than enamel. As filler material, it is possible to use, in particular, a thermo-hardening polymer (epoxy resin type), metal, ceramic or other material, which is arranged in the partitions in powder or liquid form prior to a solidifying or consolidation or polymerisation operation. Different colours of filler material 7 may be selected to fill the partitions, in order to produce a decorated element.

Another technique for creating walls, partitions or a mould on a base substrate of an element for a watch or piece of jewelry can also be envisaged. According to the invention, a LIGA (Lithographie, Galvanoformung and Abformung in German terminology) method can be used to create the walls or partitions or mould on the base substrate. In that case, the base substrate is preferably a semiconductor substrate, such as silicon, or even gallium arsenide, which may have a conductive upper layer for the electroforming operation. However, it is also possible to take a metal base substrate, typically made of copper, which can avoid the need to make a conductive layer on the surface of the base substrate.

A photosensitive resin is deposited on the base substrate with the conductive layer on the upper portion thereof. This photosensitive resin may be a polyimide PMMA (polymethyl methacrylate) based resin or an octafunctional epoxidized novalac resin available from Shell Chemical under the reference SU-8 and a photoinitiator chosen from among triarylsulfonium salts. This resin may be photopolymerized by ultraviolet (UV) radiation. However, it is also possible to envisage having a resin that is sensitive to the X rays generated by a synchrotron, but this operation is too expensive for producing the mould or partitions on the base substrate.

A contour mask of the pattern to be created on the base substrate of the element is arranged on the resin. The mask may be a glass plate on which a masking layer is formed with opaque and transparent portions according to the pattern to be made. Light radiation, for example of the ultraviolet type, is directed onto the mask to irradiate the unmasked portions of the resin. When using this type of resin, which is a negative photosensitive resin, the nonirradiated portions can be removed by physical or chemical means. This makes it possible to define the shapes of the partitions or mould in the removed portions of the resin.

It is to be noted that a positive photosensitive resin may also be used, with a mask having a masking layer with opaque and transparent portions according to the pattern to be made. This mask is the reverse of the mask used with the negative resin. In this case, it is the irradiated portions of the resin that are removed.

Thereafter, an electroforming or electroplating operation is performed. At least one metallic material is grown in the open portions of the resin from the conductive layer formed at the surface of the base substrate. Once the thickness of the deposited metal layer is sufficient to define the pattern of the desired decoration, the resin can be removed. An enameling operation may be performed immediately afterwards by inserting the vitreous substance or substances in the defined partitions and firing them in a furnace. However, the partitions may also be filled with a different type of filler material, as indicated above.

It is to be noted that the metal materials deposited by the LIGA process may be nickel or nickel phosphorus alloys, or copper based alloys, gold or even steels. In principle, it is possible to use any metal or metal alloy, or even an amorphous metal, which can be deposited by an electroplating method.

According to a technique quite similar to that described with reference to the LIGA method, it is possible to envisage using a low temperature solder instead of an electroplating or electrodeposition operation in the partitions created in the resin. The solder can advantageously be directly secured to the base substrate, if it is made of metal material, or to the conductive layer at the surface of the base substrate, such as a metal layer.

Preferably, with the different techniques for creating a decorative pattern on the element, it is sought to create a decorated element, such as a watch dial. For the watch dial decoration, a filler material could be inserted in the mould or the partitions created. This filler material may be a thermohardening polymer, a metal alloy, a ceramic, a cermet or any other type of coloured filler material. This type of filler material may be secured in the partitions at ambient temperature or at a temperature that must be lower than the melting point of the material of the partitions and of the base substrate. If the filler material is enamel, the dial with the vitreous substance arranged in the partitions must also be fired in a furnace at a fairly high temperature.

It is also to be noted that an intermediate adhesion layer could be added to each step of the production method, for example on the base substrate to create partitions or a mould. Thereafter, another adhesion layer may be added to the partitions or decorated element with the filler material, in order to add one or more further decorative layers by one of the aforecited techniques. A decorative layer may be a metal, ceramic and/or ceramo-metallic layer obtained by selective laser or electron beam sintering or melting of a powder on a transparent or non-transparent enamel to form one or more two-dimensional or three-dimensional patterns in the enamelled structure. The base substrate can also be hollowed to improve the mechanical adhesion of the filler material between the partitions.

During a selective sintering or selective melting operation, it may be envisaged to combine a metal powder and a ceramic or ceramo-metallic powder. Firstly, there may be a first selective melting operation with the metal powder, followed after the operation of filling with filler material, by a second selective sintering operation with the ceramic or ceramo-metallic powder. One or more further operations of selective melting or selective sintering of a powder on the preceding layers of the element may be performed to create a sandwich structure. Thus, a two-dimensional or three-dimensional pattern may be created on the filler material or also on the partitions or the mould by a series of fused or sintered powder layers. Of course, it is possible to use ceramic powder or ceramo-metallic powder in the first operation and the metal powder in the second operation.

From the description that has just been given, several variants of the method for producing a decorated element for a timepiece or piece of jewelry can be devised by those skilled in the art without departing from the scope of the invention defined by the claims. The decorated element may also be a watch dial, a watch hand, or a date disc, or another component of the watch, such as a seconds wheel, an oscillating weight, or a back cover of a watch case.

What is claimed is:

1. A method for producing a decorated element for a timepiece or piece of jewelry, the method including:
    forming at least one intermediate layer on a base substrate;
    arranging a powder in a programmed pattern on said base substrate and intermediate layer to micromachine on said base substrate a mould or decorative partitions; and
    filling the mould or decorative partitions with at least one filler material to obtain the decorated element,
    wherein the micromachining of the mould or the decorative partitions is obtained by the selective melting or selective sintering of the powder on the base substrate in a selective melting or selective sintering machine using a laser beam or an electron beam or in an additive fabrication machine of a metal, ceramic or ceramo-metallic material along a stored line of the pattern to be created,
    wherein the intermediate layer formed on the base substrate is an enamel layer, and
    wherein said decorated element includes the mould or decorative partitions filled with the at least one filler material.

2. The method for producing a decorated element according to claim 1, wherein the mould or the decorative partitions are filled with a vitreous substance for an enameling operation including firing the vitreous substance in a furnace to obtain the decorated element.

3. The method for producing a decorated element according to claim 1, wherein once the mould or the decorative partitions are filled with the filler material which has solidified adhering to walls of said mould or of said partitions, a machining or selective dissolution operation is performed to remove the base substrate, which is metal or ceramic or ceramo-metallic.

4. The method for producing a decorated element according to claim 1, wherein the base substrate is provided with at least one metal and/or ceramic and/or cermet layer to improve adherence thereof to the metal and/or ceramic and/or cermet powder during the selective melting or selective sintering using the laser beam or the electron beam.

5. The method for producing a decorated element according to claim 1, wherein the mould or the decorative partitions are obtained by the selective laser beam or electron beam melting or sintering of successive powder layers or in an additive fabrication machine by superposition of metal or ceramic or cermet layers.

6. The method for producing a decorated element according to claim 1, wherein one or more additional selective laser beam or electron beam melting or sintering operations are performed on or in the filler material and/or on the partitions or the mould to obtain a two-dimensional or three-dimensional decoration structure.

7. The method for producing a decorated element according to claim 1, wherein the partitions or the mould are protected by a galvanic layer, which is composed of a noble metal or metal alloy to prevent oxidation during a hot enameling operation.

8. The method for producing a decorated element according to claim 1, wherein the powder used is metal powder.

9. The method for producing a decorated element according to claim 1, wherein the powder used is ceramic powder with or without a binder.

10. The method for producing a decorated element according to claim 1, wherein the powder used is ceramo-metallic powder.

11. A method for producing a decorated element for a timepiece or piece of jewelry, the method including:
    forming at least one intermediate layer on a base substrate;
    depositing a layer of positive or negative photosensitive resin on the base substrate and intermediate layer;
    placing a contour mask in a programmed pattern to be created on the photosensitive resin;
    illuminating the resin through the mask;
    removing the illuminated portions of the resin, where the photosensitive resin is of the positive type, or removing the non-illuminated portions of the resin, where the photosensitive resin is of the negative type;
    filling the removed portions of the resin with a metal to form decorative partitions or a mould of a metal on the base substrate;
    removing all the resin; and
    filling the mould or the decorative partitions with at least one filler material to obtain the decorated element,
    wherein said decorated element includes the mould or decorative partitions filled with the at least one filler material, and
    wherein the intermediate layer formed on the base substrate is an enamel layer.

12. The method for producing a decorated component according to claim 11, wherein the base substrate is made of metallic material or includes a conductive surface layer, wherein the mould or the partitions are produced by growth of at least one metallic material by an electroplating or electrodeposition operation in open parts of the resin from the surface of the base substrate.

13. The method for producing a decorated element according to claim 1, wherein the ceramo-metallic is cermet.

14. The method for producing a decorated element according to claim 11, wherein once the mould or the decorative partitions are filled with the filler material which has solidified adhering to walls of said mould or of said partitions, a machining or selective dissolution operation is performed to remove the base substrate, which is metal or ceramic or ceramo-metallic.

15. The method for producing a decorated element according to claim 11, wherein the partitions or the mould are protected by a galvanic layer, which is composed of a noble metal or metal alloy to prevent oxidation during a hot enameling operation.

* * * * *